United States Patent
Parker et al.

[11] Patent Number: 5,147,116
[45] Date of Patent: Sep. 15, 1992

[54] INTEGRAL ABS AND TRACTION CONTROL HAVING AN ELECTRIC MODULATOR

[75] Inventors: Donald L. Parker, Middletown, Ohio; Jerry L. Newton, Richmond, Ind.; David F. Reuter, Beavercreek, Ohio; Fred W. Huntzicker, Ann Arbor, Mich.

[73] Assignee: General Motors Corporation, Detroit, Mich.

[21] Appl. No.: 723,127

[22] Filed: Jun. 28, 1991

[51] Int. Cl.$^5$ .............................................. B60T 8/42
[52] U.S. Cl. ...................... 303/115 EC; 303/113 TR; 303/DIG. 6
[58] Field of Search ........ 303/113 R, 113 TR, 115 R, 303/115 EC, 103, 110, 115 UM, 115 PP, 100, 115 FM, 116 R, 116 SP, DIG. 6

[56] References Cited

U.S. PATENT DOCUMENTS

| | | | |
|---|---|---|---|
| 4,653,815 | 3/1987 | Agarwal et al. | 303/100 |
| 4,756,391 | 7/1988 | Agarwal et al. | 303/100 X |
| 4,938,543 | 7/1990 | Parker et al. | 303/103 X |
| 4,986,614 | 1/1991 | Ricker et al. | 303/100 X |
| 5,000,523 | 3/1991 | Mikhaeil-Boules et al. | 303/115 EC |
| 5,000,524 | 3/1991 | Savage | 303/115 EC |
| 5,042,885 | 8/1991 | Villec | 303/110 |

FOREIGN PATENT DOCUMENTS 8058 1/1988 Japan ............................ 303/115 EC

*Primary Examiner*—Robert J. Oberleitner
*Assistant Examiner*—Alfred Muratori
*Attorney, Agent, or Firm*—Ernest E. Helms

[57] ABSTRACT

An integrated anti-lock braking (ABS)/traction control (TC) braking system is provided which includes a controller cognizant of a rotational condition of a wheel, a master cylinder, an actuator with a bore, the bore having a first fluid connection with a master cylinder and space therefrom a second fluid connection with a brake, a first normally open solenoid valve for isolating the master cylinder from the wheel brake when the controller places the system in an ABS or TC mode, and a hollow primary piston mounted within the bore along first, second and third spaced sealed peripheries having a first port connecting the interior of the primary piston with its exterior between the first and second sealed peripheries and communicating with the second fluid connection of the bore. The primary piston also has a second port fluidly connecting an end of the primary piston most adjacent to the bore first fluid connection with the interior of the primary piston and the primary piston having a check valve mounted within the second port and the primary piston has a third sealed periphery generally adjacent the bore first fluid connection. A secondary piston is mounted within the primary piston movable in a direction towards the bore first fluid connection to pressurize the brake and movable in an opposite direction to release the pressure within the brake, the secondary piston has an extreme position with respect to the primary piston wherein the secondary piston opens the check valve and further movement of the secondary piston causes the pistons to move in unison pressurizing the wheel brake. A reversible motor connected with a gear train, drive screw and nut moves the secondary piston in response to signal give by the controller.

3 Claims, 1 Drawing Sheet

INTEGRAL ABS AND TRACTION CONTROL HAVING AN ELECTRIC MODULATOR

FIELD OF THE INVENTION

The field of the present invention is that of an integrated anti-lock braking system (ABS) and traction control (TC) braking system for a vehicle and methods of utilization thereof.

DISCLOSURE STATEMENT

Anti-lock braking systems typically modulate the pressure delivered to a vehicle wheel brake to prevent the vehicle wheel from locking up in the braking condition. Conversely, traction control systems typically incorporate an automated braking system which actuates a brake to prevent spinning of the vehicle wheel, thereby maximizing the traction which can be exerted by that wheel. A more detailed analysis of anti-lock braking systems can be found in commonly assigned U.S. Pat. Nos. 4,756,391 and 4,653,815. A more detailed explanation of traction control systems which utilize actuation of a vehicle wheel brake for traction control can be found in commonly assigned U.S. Pat. No. 4,976,500.

The present invention provides an ABS/TC integration which is an alternative to that provided and described in coassigned Parker et al U.S. Pat. No. 4,938,543 and Vilec U.S. Pat No. 5,042,885 and U.S. patent application 07/641,570 filed Mar. 19, 1991.

SUMMARY OF THE INVENTION

The present invention provides an ABS and TC integration apparatus and method of utilization thereof which allows a common actuator mechanism to provide the ABS and TC functions.

It is an object of the present invention to provide an integrated ABS/TC braking system and method utilization thereof.

Other objects and advantages of the present invention can become more apparent to those skilled in the art as the nature of the invention is better understood from the accompanying drawings and a detailed description.

DETAILED DESCRIPTION OF THE DRAWINGS

Figure 1:
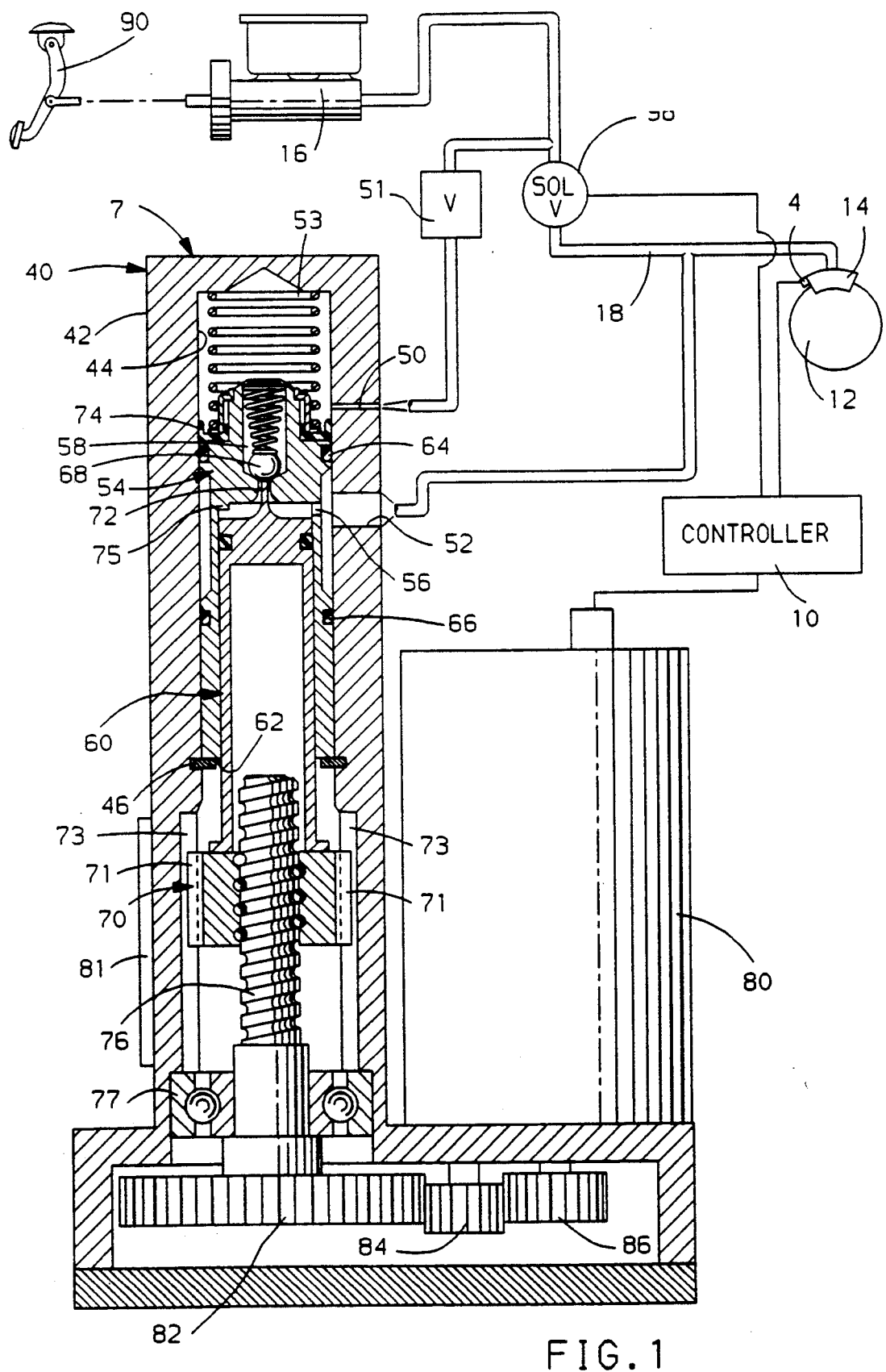
FIGURE 1 is a sectional view with portions illustrated schematically of a preferred embodiment ABS/TC integrated braking system according to the present invention.

Referring to FIGURE 1 an integrated anti-lock ABS)/traction control (TC) braking system 7 has a master cylinder 16 for delivering pressurized fluid to a vehicle fluid actuated wheel brake 14 (commonly referred to as a brake cylinder for drum type brakes or as a caliper for disc type brakes). The master cylinder is linked with a pedal linkage 90 which is manipulated by a vehicle operator.

The braking system has a system controller 10 which via a sensor 4 is cognizant of the rotational condition of the vehicle wheel(s) 12. The controller 10 will signal the braking system integration 7 to an ABS or TC mode as required. An actuator is also provided.

An actuator 40 is also provided. The actuator has a frame 42 with a multidiameter longitudinal bore 44. The actuator frame longitudinal bore 44 is fluidly connected with the master cylinder of via a first fluid connection 50. Fluid connection 50 is typically a very small diameter bore approximately 0.028 inch diameter. Spaced from the first fluid connection is a second fluid connection 52 of the longitudinal bore with the wheel brake 14.

The master cylinder 16 is connected with the wheel brake via a first fluid line 18 which has inserted therein a normally open solenoid valve 98. The solenoid valve 98 is utilized to isolate the wheel brake 14 from the master cylinder 16 whenever the integration 7 is signalled to an ABS or TC mode.

Referring back to the actuator 40, the longitudinal bore 44 has a stop means provided by a ledge or snap ring 46. Slidably mounted within the longitudinal bore having an edge 62 for contact with the ledge 46 is a primary piston 54. The primary piston 54 is held against the clip 46 by a biasing spring 53. The primary piston 54 is sealed along three spaced peripheral locations by O-rings 64 and 66 and U-block seal 74 which is generally adjacent the first fluid connection 50. The primary piston is also hollow having a first port 56 connecting the interior of the primary piston with its exterior between the O-rings 64 and 66.

The primary piston 54 also has a second port 58 connecting its interior with a portion of the longitudinal bore more adjacent to the first fluid connection 50. Mounted within the second port is a check valve 68 which unless held open prevents flow from the master cylinder to the interior of the primary piston 54.

Slidably and sealably mounted within the interior of the primary piston 54 is a secondary piston 60. The secondary piston 60 is movable in a direction towards the first fluid connection 50 to pressurize the fluid in the wheel brake 14, or is movable in an opposite direction to relieve (release) the wheel brake 14. In a predetermined position with respect to the primary piston 54, the secondary piston 60 has a stem 72 for opening of the check valve 68. Movement of the secondary piston 60 further towards contact with an edge block 75 of the primary piston in an extreme position with respect to the same will cause the primary piston 54 to move in unison with the secondary piston 60.

The secondary piston 60 is operatively associated with in the instance shown a fixably connected nonrotative nut 70. The nut 70 has flange members 71 which make contact with secondary alignment edges 73 of the bore to keep the nut from rotating. The secondary piston 60 via the nut 70 is penetrated by and threadably engaged with a driven member referred to as a ball, drive or power screw 76. The screw 76 is mounted within the longitudinal bore 44 by a bearing 77 and at its lower end can be surrounded by a pair of bevel washers (not shown) which cushion possible contact of the nut when bottoming out the secondary piston within the bore 44.

The screw 76 is driven by a motor which is gearably engaged with the screw 76 by a gear train comprised of a large primary 82 and an (optional) secondary idler gear 84 and a motor pinion gear 86. The pinion gear 86 is attached to a rotor of a reversible DC motor 80. The actuator will also have a sensor 81 typically of a magnetic or similar electrical type device which will allow the system controller 10 to know the exact location of the nonrotative nut thereby knowing the location of the secondary piston 60. If a brushless motor is utilized the sensor may be eliminated since a brushless motor can indicate to the controller the number of its rotations and cumulative angular location.

Juxtaposed between the master cylinder 16 and the first fluid connection 50 is a flow control valve 51. The flow control valve 51 allows almost totally nonresistant flow from the longitudinal bore 44 back towards the master cylinder 16 however the flow control valve 51 has a fluid resistor for fluid flow from the master cylinder 16 to the longitudinal bore via 44 the first fluid connection.

In normal vehicle brake operation the solenoid valve 98 will be open and fluid will flow from the master cylinder 16 through the solenoid valve 98 to the wheel brake 14. Additionally, for emergency operation in case of catastrophic solenoid valve failure (the solenoid valve is configured to only fail in the open position) in an unforeseen manner, fluid is allowed to flow from the master cylinder through the flow control 51 valve into the longitudinal bore 44 via the first fluid connection 50 past the check valve 68 which is held open by the secondary piston 60, and out to the wheel. Relief of the wheel brake 14 operates in the same manner with the flow patterns reversing those previously given.

If an ABS condition is realized, the controller 10 will signal the solenoid valve 98 to the closed position isolating the master cylinder 16 from the wheel brake 14 The controller will also signal the motor 80 to retrack the secondary piston 60 for the first ABS cycle wherein the pressure within the wheel brake 14 is to be relieved. Pressure reapply will be accomplished by signalling the motor 80 to reverse the direction of the secondary piston 60 to reapply brake pressure. It will be apparent to those skilled in the art that the retraction of the secondary piston 60 will allow the check valve 68 to close. However, if in an ABS condition the pressure within the wheel brake 14 becomes larger than the pressure within the master cylinder 16, (which may have been decreased by the vehicle operator decreasing the force of his foot on the brake pedal) the pressure within the interior of the primary piston 54 will open up the check valve 68. Therefore, the check valve 68 functions as a pressure equalization valve to always maintain the pressure within the wheel brake 14 in the ABS condition to be equal or less than that of the pressure within the master cylinder 16.

On certain occasions the integration 7 will initially be signaled to an ABS condition when the vehicle wheel 12 is on ice. Therefore the initial pressure that the vehicle operator was placing the wheel brake 14 was quite low. However, as the vehicle wheel 12 traverses the ice and is now engaged on a snow covered surface it is desirable to increase the pressure available to the wheel brake 14. To accomplish the above the secondary piston will be extended to the point to where it again opens up the check valve 68. Pressure from the master cylinder 16 will now be allowed to feed into the wheel brake 14, even though the solenoid valve 98 still remains closed since that wheel is still within an ABS condition. The flow restrictor valve 51 now comes into play by preventing an inordinate pressure pulse from the master cylinder 16 to the wheel brake 14 which could inadvertently cause the wheel brake 14 pressure to rise too rapidly and to temporarily lock the wheel 12 again.

In a traction control situation again the solenoid valve 98 will be closed to isolate the master cylinder 16 from the wheel brake 14. The motor 80 will be signalled to extend the secondary piston 60. Since the secondary piston at its home positon is already opening the check valve 68 further movement upward of the secondary piston 60 will lift the primary piston 54 from its clip 46 causing the fluid in the capped longitudinal bore 44 (now sealed by seal 74) above the primary piston 54 to be pressured into the wheel brake 14. The traction control release cycle will be accomplished by the motor being signalled to retract the secondary and primary pistons in unison back towards their rest position. The V-block seal 74 is provided to prevent the seal from suffering damage as it move back and forth over the first fluid connection 50 which is usually a small orifice. In traction control pressure apply the capped longitudinal bore 44 will not develop full pressure until the seal 74 has passed the connection 50 and on a retractive cycle the pressure in the capped bore 44 will be reduced before the V-block seal 74 passes the connection 50.

While a few of the embodiments of the present invention have been explained it will be readily apparent to those skilled in the art of the various modifications which can be made to the present invention without departing from the spirit and scope of this application as it is encompassed by the following claims.

We claim:

1. An integrated anti-lock braking/traction control braking system for a vehicle having a fluid actuated wheel brake comprising:

a system controller cognizant of a rotational condition of a wheel for signalling the system to an anti-lock braking or traction control mode;

master cylinder means for fluidly delivering pressurized fluid to the wheel brake;

an actuator frame with a longitudinal bore, the bore having a first fluid connection with the master cylinder and spaced therefrom a second fluid connection with the wheel brake;

a first normally open solenoid valve for isolating the master cylinder from the wheel brake when the controller places the system in an anti-lock braking or traction control mode;

a hollow primary piston slidably mounted within the longitudinal bore along first, second and third spaced sealed peripheries having a first port connecting the interior of the primary piston with its exterior between the first and second sealed peripheries and communicating with the second fluid connection of the bore, and the primary piston having a second port fluidly connecting an end of the primary piston most adjacent to the bore first fluid connection with the interior of the primary piston and the primary piston having a check valve mounted within the second port and the primary piston having the third sealed periphery generally adjacent the bore first fluid connection;

a secondary piston slidably sealably mounted within the primary piston movable in a direction towards the bore first fluid connection to pressurize said wheel brake and movable in an opposite direction to release the pressure within the wheel brake, the secondary piston having an extreme position with respect to the primary piston wherein the secondary piston opens the check valve within the second port of the primary piston and further movement of the secondary piston with respect to the primary piston causes the pistons to move in unison pressurizing the wheel brake;

a nut operatively associated with the secondary piston;

means to prevent the nut from rotating;

a drive screw threadably engaged and projecting through the unit;
a gear train connected with the drive screw; and
a reversible motor connected with the gear train for moving the secondary piston in response to signals given by the controller.

2. A anti-lock braking/traction control braking system integration as described in claim 1 further including a flow control valve restraining fluid flow from the master cylinder to the longitudinal bore first fluid connection and providing significantly reduced restriction of flow from the interior of the primary piston towards the master cylinder.

3. An anti-lock braking/traction control braking system integration as described in claim 1 wherein said third sealed periphery includes a V-block type seal.

* * * * *